US009283939B2

(12) United States Patent
Kim

(10) Patent No.: US 9,283,939 B2
(45) Date of Patent: Mar. 15, 2016

(54) PEDAL SIMULATOR FOR ACTIVE BRAKE SYSTEM

(71) Applicant: MANDO CORPORATION, Pyeongtaek-si, Gyeonggi-do (KR)

(72) Inventor: Yong Kap Kim, Suwon-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 393 days.

(21) Appl. No.: 14/024,257

(22) Filed: Sep. 11, 2013

(65) Prior Publication Data

US 2014/0069093 A1 Mar. 13, 2014

(30) Foreign Application Priority Data

Sep. 11, 2012 (KR) ........................ 10-2012-0100334

(51) Int. Cl.

| | |
|---|---|
| ***B60T 8/32*** | (2006.01) |
| ***B60T 11/10*** | (2006.01) |
| ***B60T 13/20*** | (2006.01) |
| ***B60T 8/40*** | (2006.01) |

(52) U.S. Cl.

CPC ............... *B60T 11/102* (2013.01); *B60T 8/409* (2013.01); *B60T 13/20* (2013.01)

(58) Field of Classification Search

CPC ............................... B60T 8/409; B60T 8/4081

See application file for complete search history.

(56) References Cited

U.S. PATENT DOCUMENTS

| | | | | |
|---|---|---|---|---|
| 2003/0205932 | A1* | 11/2003 | Anderson | 303/114.1 |
| 2008/0010985 | A1* | 1/2008 | Miyazaki et al. | 60/565 |

FOREIGN PATENT DOCUMENTS

| | | | |
|---|---|---|---|
| JP | 2002-293229 | A | 10/2002 |
| JP | 2004-026134 | A | 1/2004 |
| JP | 2007-203927 | A | 8/2007 |
| JP | 2009-227172 | A | 10/2009 |
| WO | 03/059711 | A1 | 7/2003 |

OTHER PUBLICATIONS

Korean Office Action dated Jun. 25, 2015 issued in Korean Patent Application No. 10-2012-0100334.

* cited by examiner

*Primary Examiner* — F. Daniel Lopez

(74) *Attorney, Agent, or Firm* — McDermott Will & Emery LLP

(57) ABSTRACT

Disclosed herein is a pedal simulator for an active brake system. The pedal simulator includes a simulator block provided therein with a bore, a first reaction unit including a first reaction piston slidably installed in the bore, a first damping member installed at the first reaction piston, and a first reaction spring compressed by the first reaction piston, and a second reaction unit including a second reaction piston provided in the bore to support the first reaction spring and slide in the bore, a damping housing connected to the simulator block to be spaced a certain distance apart from the second reaction piston, a second reaction spring installed between the second reaction piston and the damping housing to be compressed by the second reaction piston, and a second damping member installed in the damping housing to contact the second reaction piston. The second damping member is configured with an upper damper and a lower damper.

12 Claims, 5 Drawing Sheets

PEDAL SIMULATOR FOR ACTIVE BRAKE SYSTEM

CROSS-REFERENCE TO RELATED APPLICATION(S)

This application claims the benefit of Korean Patent Application No. 2012-0100334, filed on Sep. 11, 2012 in the Korean Intellectual Property Office, the disclosure of which is incorporated herein by reference.

BACKGROUND

1. Field

Embodiments of the present invention relate to a pedal simulator for an active brake system which may improve pedal feel.

2. Description of the Related Art

Generally, an active hydraulic boost (AHB) is a brake system that generates braking force when a driver pushes the pedal by sensing the push through an electronic control unit and supplying hydraulic pressure to the master cylinder through operation of a hydraulic pressure generation unit, thereby transferring hydraulic pressure for braking to a wheel cylinder of each wheel. In the case of such AHB, when the driver pushes the pedal during normal braking, a pedal displacement sensor senses the displacement of the brake pedal. The electronic control unit operates the hydraulic pressure generation unit and controls supply of the hydraulic oil stored in a hydraulic oil reservoir to a boost chamber of the master cylinder to produce pressure in the master cylinder. The pressure produced in the master cylinder presses a piston in the master cylinder to produce hydraulic brake pressure. This hydraulic brake pressure is transferred to the wheel cylinder to produce braking force.

In the case that the pressure in the master cylinder changes during regenerative braking, the resulting force may be directly transferred to the brake pedal, thereby adversely affecting pedal feel. When the pedal feel is degraded in this way, a large difference occurs between pedal feel that the driver receives in braking and the actual level of pressure applied to the brake disc of the brake pad in the wheel cylinder, resulting in excessive or insufficient braking. Thereby, disposable components such as the brake pad may need to be frequently replaced and sudden braking or failure of braking leading to a traffic accident may occur.

In conventional cases, a pedal simulator is adopted for the AHB to provide reaction force to the brake pedal. Such a pedal simulator uses, as disclosed in Korean Patent No. 10-0657576, two springs provided therein as shock absorbing members to absorb shock to a simulator piston. However, the two springs merely produces pedal feel of the brake linearly varying along the straight lines as shown in FIG. 1, and may not provide required pedal feel.

CITED REFERENCE

Patent Document

Korean Patent No. 10-0657576 (Date of Patent: Dec. 7, 2006)

SUMMARY

Therefore, it is an aspect of the present invention to provide a pedal simulator for active brake system which may improve pedal feel by provide a low reaction force in the initial section of braking and high reaction force in the terminal section of braking.

Additional aspects of the invention will be set forth in part in the description which follows and, in part, will be obvious from the description, or may be learned by practice of the invention.

In accordance with one aspect of the present invention, a pedal simulator installed at a master cylinder to receive oil pressure according to a driver's foot force to provide pedal feel to the driver, includes a simulator block provided with an oil hole connected to the master cylinder, and provided therein with a bore to communicate with the oil hole, a first reaction unit including a first reaction piston slidably installed in the bore, a first damping member installed at the first reaction piston to move together with the first reaction piston, and a first reaction spring compressed by the first reaction piston, and a second reaction unit including a second reaction piston provided in the bore to be spaced a certain distance apart from the first reaction piston and to support the first reaction spring and slide in the bore, a damping housing connected to the simulator block to be spaced a certain distance apart from the second reaction piston, a second reaction spring installed between the second reaction piston and the damping housing to be compressed by the second reaction piston, and a second damping member installed in the damping housing to contact the second reaction piston, wherein the second damping member is configured with an upper damper and a lower damper, wherein hardness of the lower damper is greater than or equal to hardness of the upper damper.

A lower end of the upper damper may be provided with a protrusion or groove, and an upper end of the lower damper may be provided with a protrusion or groove having a shape corresponding to the protrusion or groove of the upper damper to be coupled to the upper damper.

The first damping member and second damping member may be formed of rubber to be elastically deformable.

The damping housing may include a body having a cylindrical shape with an open top and provided therein with an accommodation space, and a flange radially extending from an outer circumferential surface of a lower portion of the body, wherein the flange may be connected to the bore.

An upper surface of the flange may be provided with a support groove to support the second reaction spring.

The second damping member may be installed in the accommodation space of the body to define a predetermined space between the second damping member and the accommodation space such that a volume of the space changes when the second damping member is elastically deformed by being pressed.

A concave groove recessed upward to form a stepped portion may be formed at a lower end of the first reaction piston, wherein the first damping member may be installed in the concave groove, and an upper end of the first reaction spring is supported by the stepped portion.

The second reaction piston may include a protrusion protruding toward the first damping member to be spaced a certain distance from the first damping member, and an extension extending radially outward from a lower end of the protrusion, wherein the protrusion is inserted into the first reaction spring such that a lower end of the first reaction spring is supported by the extension.

The first damping member may contact the second reaction piston to provide reaction force when the first reaction piston is pushed, and the second damping member may be pressed to provide reaction force when the second reaction piston is pushed.

A modulus of elasticity of the first reaction spring may be lower than a modulus of elasticity of the second reaction spring such that the second reaction piston is pushed after the first reaction piston is pushed.

A cap may be installed at a lower end of the damper housing to fix the damper housing to the simulator block.

The first reaction unit and the second reaction unit may be arranged in series in the bore.

BRIEF DESCRIPTION OF THE DRAWINGS

These and/or other aspects of the invention will become apparent and more readily appreciated from the following description of the embodiments, taken in conjunction with the accompanying drawings, of which.

DETAILED DESCRIPTION

Figure 1:
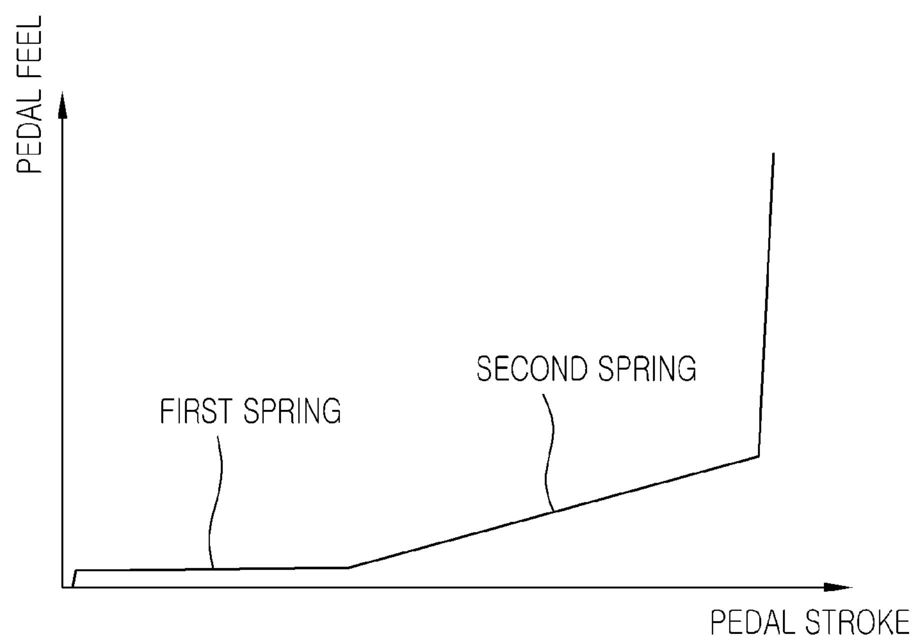
FIG. 1 is a graph illustrating a relationship between the pedal stroke by a conventional pedal simulator and pedal feel.

Reference will now be made in detail to the embodiments of the present invention, examples of which are illustrated in the accompanying drawings, wherein like reference numerals refer to like elements throughout.

Figure 2:
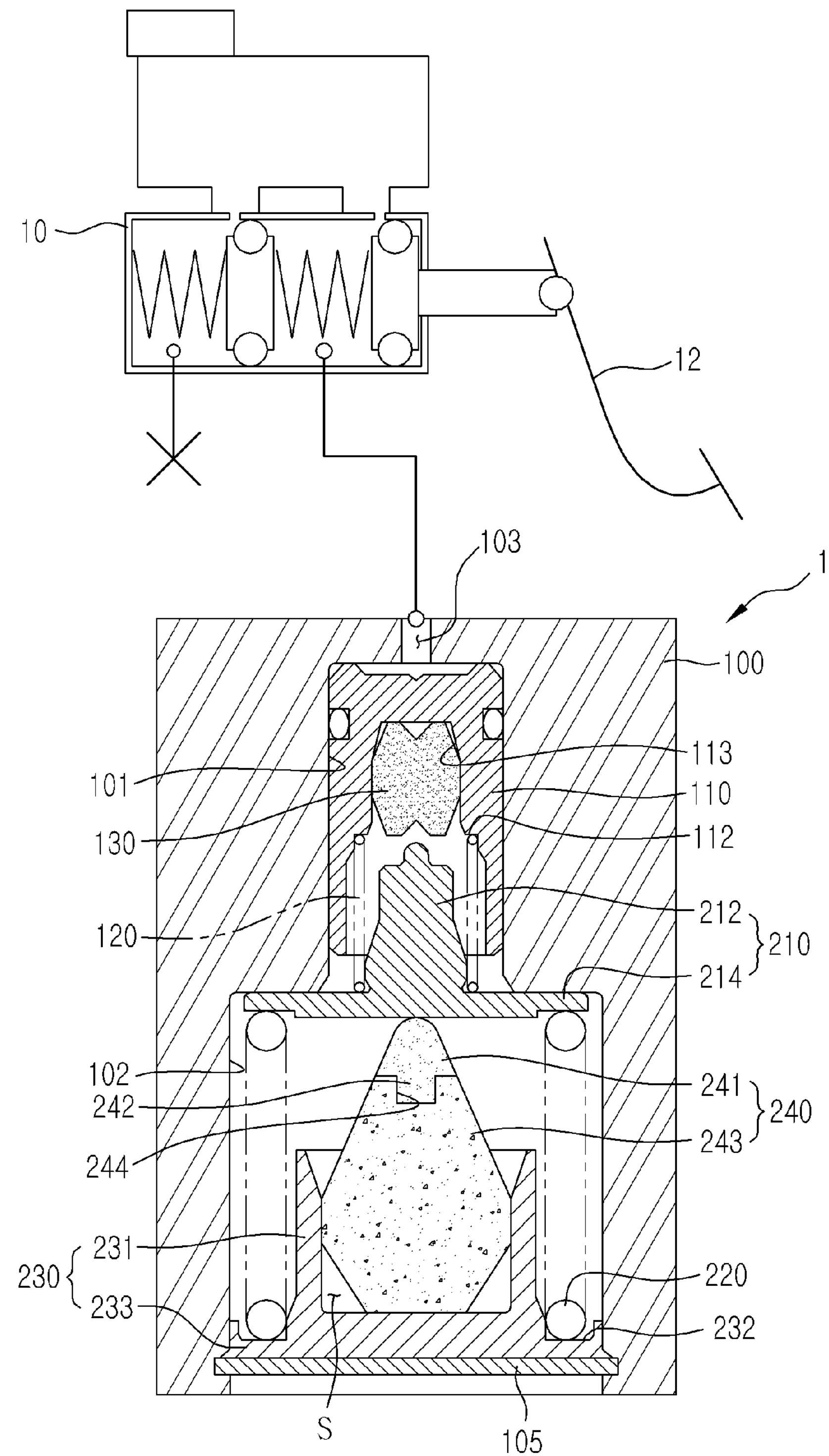
FIG. 2 is a view showing a pedal simulator for an active brake system according to an exemplary embodiment of the present invention.

FIG. 2 is a view showing a pedal simulator for an active brake system according to an exemplary embodiment of the present invention.

Referring to FIG. 2, the pedal simulator 1 includes a simulator block 100 installed at a master cylinder 10, which is caused to produce hydraulic brake pressure by a brake pedal 12, to accommodate oil from the master cylinder 10, and a first reaction unit and a second reaction unit installed at the simulator block 100 to provide pedal feel. Herein, the first reaction unit and the second reaction unit are formed in the simulator block 100 and arranged in series in a bore.

The simulator block 100 is provided with an oil hole 103 to allow inflow of hydraulic pressure from the master cylinder 10, and provided therein with a bore communicating with the oil hole 103. Herein, the bore formed in the simulator block 100 including a first bore 101, in which the first reaction unit is disposed, and a second bore 102, in which the second reaction unit is disposed, thereby having a stepped shape. Referring to FIG. 2, the first bore 101 has a smaller diameter than the second bore 102.

The first reaction unit includes a first reaction piston 110 slidably installed in the first bore 101, a first damping member 130 installed to move together with the first reaction piston 110, and a first reaction spring 102 compressed by the first reaction piston 110.

When hydraulic pressure is introduced through the oil hole 103 located at the upper portion of the first reaction piston 110, the first reaction piston 110 moves downward. Herein, a concave groove 113 recessed upward in a stepped manner is formed at the lower end of the first reaction piston 110. A first damping member 130 is press-fit into the concave groove 113 such that the first reaction piston 110 and the first damping member 130 move together. In addition, the stepped section 112 of the concave groove 113 supports the upper end of a first reaction spring 120 to provide reaction force during movement of the first reaction piston 110.

The first damping member 130 is formed of rubber which is elastically deformable. The first damping member 130 functions to provide reaction force to the brake pedal 12 when contacted and pressed by a second reaction piston 210, which will be described later.

The first reaction spring 120 is formed in a coil shape to provide reaction force to the brake pedal 12. Herein, the lower end of the first reaction spring 120 is supported by the second reaction piston 210, which will be described later.

The second reaction unit includes a second reaction piston 210 provided in the second bore 102 to slide, a damping housing 230 connected to the simulator block 100 to be spaced a certain distance apart from the second reaction piston 210, a second reaction spring 220 installed between the second reaction piston 210 and the damping housing 230 to be compressed by the second reaction piston 210, and a second damping member 240 installed in the damping housing 230 to contact the second reaction piston 210.

The second reaction piston 210 is spaced a certain distance from the first reaction piston 110 to support the lower end of the first reaction spring 120. More specifically, the second reaction piston 210 includes a protrusion 212 protruding toward the first damping member 130 to be spaced a certain distance from the first damping member 130, and an extension 214 extending radially outward from the protrusion 212.

As shown in the drawings, the protrusion 212 protrudes toward the first bore 101. Thereby, the protrusion 212 is positioned in the first reaction piston 110 and spaced a certain distance apart from the first damping member 130. Herein, the protrusion 212 is arranged to be inserted into the first reaction spring 120 to allow the lower end of the first reaction spring 120 to be supported by the extension 214.

The extension 214 is arranged between the first and second reaction springs 120 and 220 to support the lower end of the first reaction spring 120 and the upper end of the second reaction spring 220. Herein, the second damping member 240 is arranged at the lower end of the extension 214 such that the extension 214 applies pressure to the second damping member 240. Accordingly, the lower surface of the extension 214 may have a flat shape.

The second reaction spring 220 is formed in a coil shape to provide reaction force to the brake pedal 12. That is, when the second reaction piston 210 moves, the second reaction spring 220 is compressed to provide reaction force. Herein, the modulus of elasticity of the second reaction spring 220 is greater than that of the first reaction spring 120. Thereby, the second reaction piston 210 is pushed after the first reaction piston 110 is pushed.

As described above, the damping housing 230 is spaced a certain distance apart from the second reaction piston 210 and is connected to the lower end of the second bore 102. The damping housing 230 includes a body 231 having a cylindrical shape with an open top and a flange 233 radially extending from the outer circumferential surface of the lower portion of the body 231.

The body 231 is provided therein with an accommodation space. The second damping member 240 is installed in the accommodation space. The flange 233 is connected to the lower end of the second bore 102, and is provided, in the upper surface thereof, with a support groove 232 to support the second reaction spring 220. The body 231 is integrated with the flange 233.

The second damping member 240 is formed of rubber, which is elastically deformable. The second damping member 240 functions to provide reaction force to the brake pedal 12 when contacted and pressed by the second reaction piston 210. The second damping member 240 is installed in the accommodation space of the body 231, as described above. As shown in FIG. 2, the second damping member 240 protrudes from the open top of the body 231. The second damping member 240 is installed such that a predetermined space S is defined between the second damping member 240 and the accommodation space. This is intended to allow volumetric change of the space when the second damping member 240 is pressed by the second reaction piston 210 and thus elastically deformed.

More specifically, the second damping member 240 is configured with an upper damper 241 and a lower damper 243. Hardness of the lower damper 243 is greater than or equal to that of the upper damper 241. This is intended to provide proper pedal feel in braking by dividing the stroke section of the brake pedal 12 into the initial section (see 'A' in FIG. 5) and the terminal section (see 'B' in FIG. 5). For example, in the case that hardness of the second damping member 240 is low, low reaction force is produced. Thereby, good pedal feel may be provided in the initial section A, but poor pedal feel resulting from yielding pedal movement may be provided in the terminal section B. In the case that hardness of the second damping member 240 is high, high reaction force is produced from the initial section A to create high resistance to movement of the pedal, thereby degrading the pedal feel. Therefore, the second damping member 240 may be formed in a double structure to provide low reaction force in the initial section A and high reaction force in the terminal section B, thereby improving the pedal feel. In the case that the upper damper 241 and the lower damper 243 are formed to have the same hardness, the same effect as above may be obtained by allowing the second damping member 240 to have hardness greater than the hardness of the first damping member 130.

As described above, a protrusion 242 or groove (not shown) is formed at the lower end of the upper damper 241, a groove 244 or protrusion (not shown) having a shape corresponding to that of the protrusion 242 or groove is formed at a position on the upper end of the lower damper 243 corresponding to the position of the protrusion 242 or groove. In this embodiment, the protrusion 242 is formed at the lower end of the upper damper 241 and the groove 244 is formed at the upper end of the lower damper 243 such that the protrusion 242 is coupled to the groove 244. Alternatively, a groove may be formed at the lower end of the upper damper 241 and a protrusion may be formed at the upper end of the lower damper 243, as described above.

Meanwhile, the reference numeral '105' represents a cap installed to fix the damping housing 230 to the simulator block 100.

In the pedal simulator 1 as above, the first and second reaction units are arranged in series. Thereby, the second reaction piston 210 is adapted to be pushed after the first reaction piston 110 is pushed. That is, when the first reaction piston 110 is pushed to compress the first reaction spring 120, a first reaction force is produced. In addition, as the second reaction piston 210 contacts and presses the first damping member 130, the first damping member 130 is elastically deformed to produce a second reaction force. Subsequently, as the lower end of the first reaction piston 110 comes into contact with the second reaction piston 210 and presses the second reaction piston 210, a third reaction force is produced by the second reaction spring 220. Subsequently, the second reaction piston 210 compresses the second reaction spring 220, contacting the second damping member 240 to apply pressure to the upper damper 241. Thereby, a fourth reaction force is produced by the second reaction spring 220 and the upper damper 241. Finally, as the second damping member 240 is further pressed, a fifth reaction force is produced according to elastic deformation of the upper damper 241 and the lower damper 243 and compression of the second reaction spring 220. Thereby, pedal feel is provided to the driver.

Hereinafter, operation of the pedal simulator for active brake system as above will be described with reference to FIG. 3 and FIG. 4.

Figure 3:
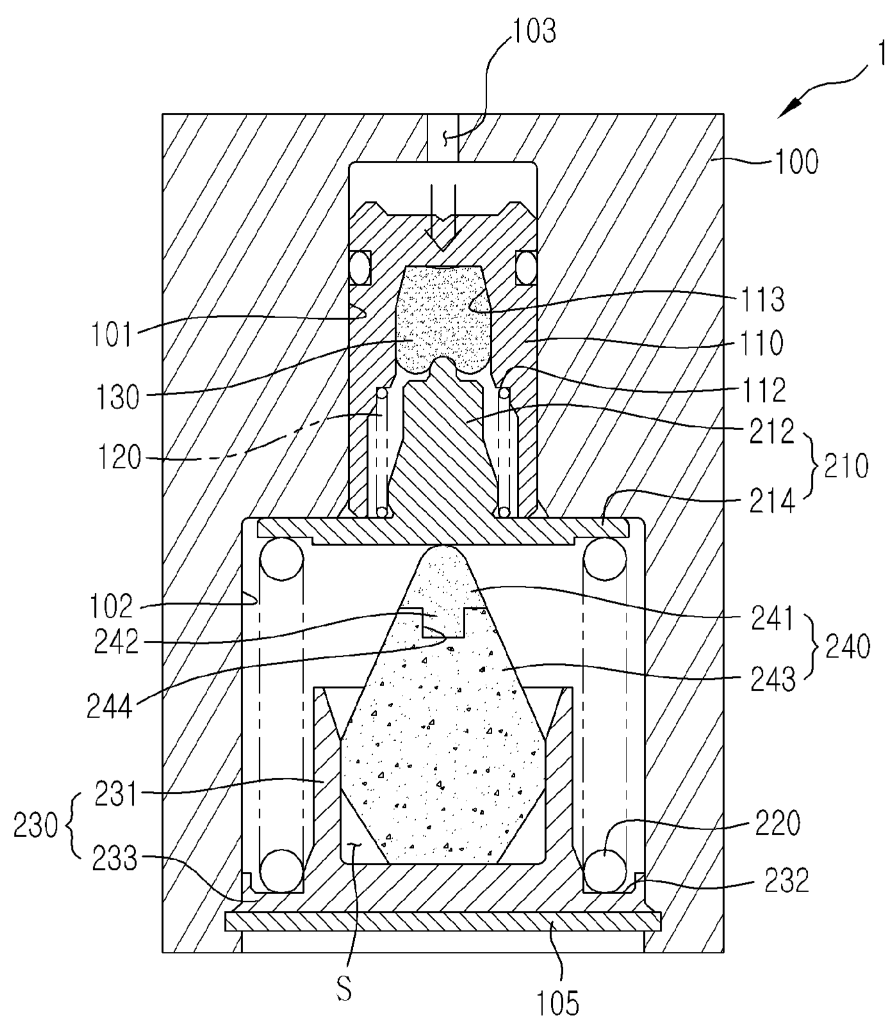
FIGS. 3 and 4 are views illustrating operation of the pedal simulator for an active brake system shown in FIG. 2.

As shown in FIG. 3, when hydraulic pressure is introduced from the master cylinder (see '10' in FIG. 2) through the oil hole 103 of the simulator block 100, the first reaction piston 110 is pushed to compress the first reaction spring 120. Thereby, reaction force is produced. In addition, the first damping member 130 installed at the first reaction piston 110 is also moved and pressed by the second reaction piston 210 to produce reaction force.

Figure 4:
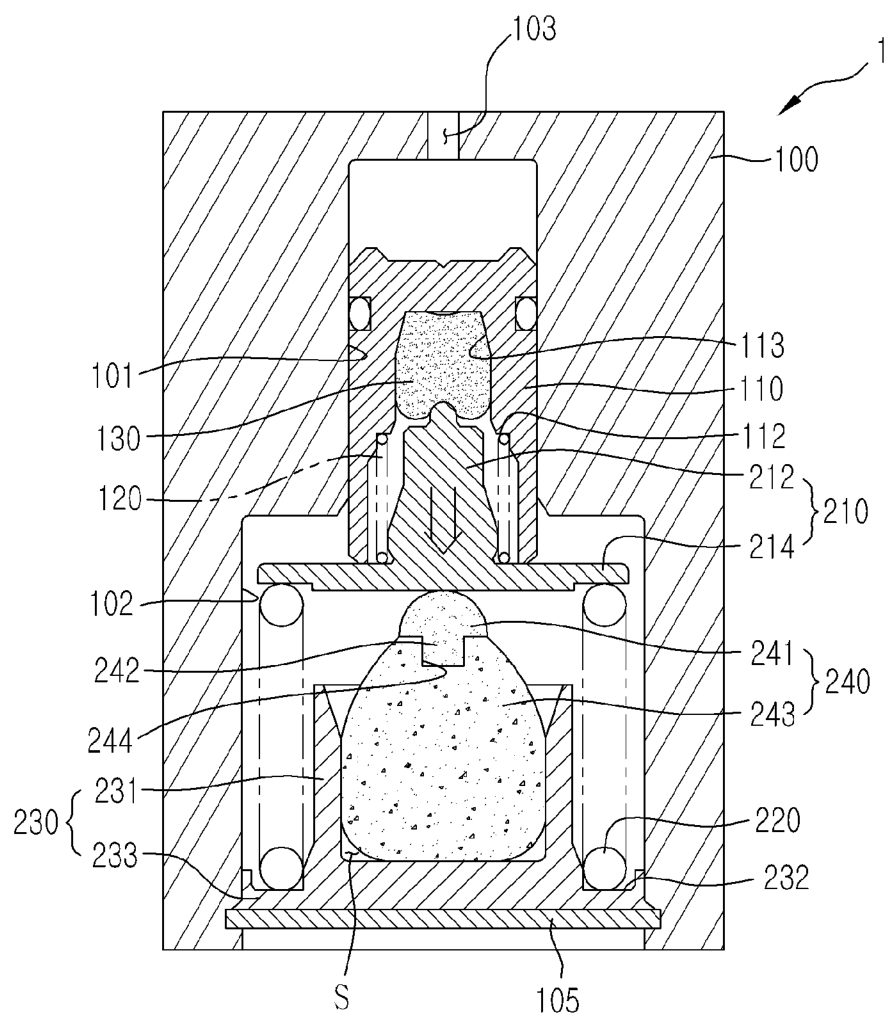

Subsequently, as shown in FIG. 4, as the first reaction piston 110 is moved, the lower end contacts the second reaction piston 210 and pushes the second reaction piston 210, thereby compressing the second reaction spring 220 to produce reaction force. At this time, as the second reaction piston 210 contacts and presses the upper damper 241 of the second damping member 240 positioned at the lower portion of the second reaction piston 210, the upper damper 241 is pressed to produce reaction force. In this state, when the second reaction piston 210 is further pushed, the upper damper 241 and the lower damper 243 are pressed, producing large reaction force. That is, low reaction force may be provided in the initial section (see 'A' in FIG. 5) of stroke of the brake pedal (see '12' in FIG. 2) according to reaction forces from the second reaction spring 220 and the upper damper 241 and high reaction force may be provided in the terminal section (see 'B' in FIG. 5) of stroke of the brake pedal 12 as reaction forces from the second reaction spring 220, the upper damper 241 and the lower damper 243 is combined.

Meanwhile, when the second damping member 240 is pressed, the second damping member 240 is easily elastically deformed by the predetermined space S defined between the damping housing 230 and the second damping member 240, along with volumetric change of the space.

Figure 5:
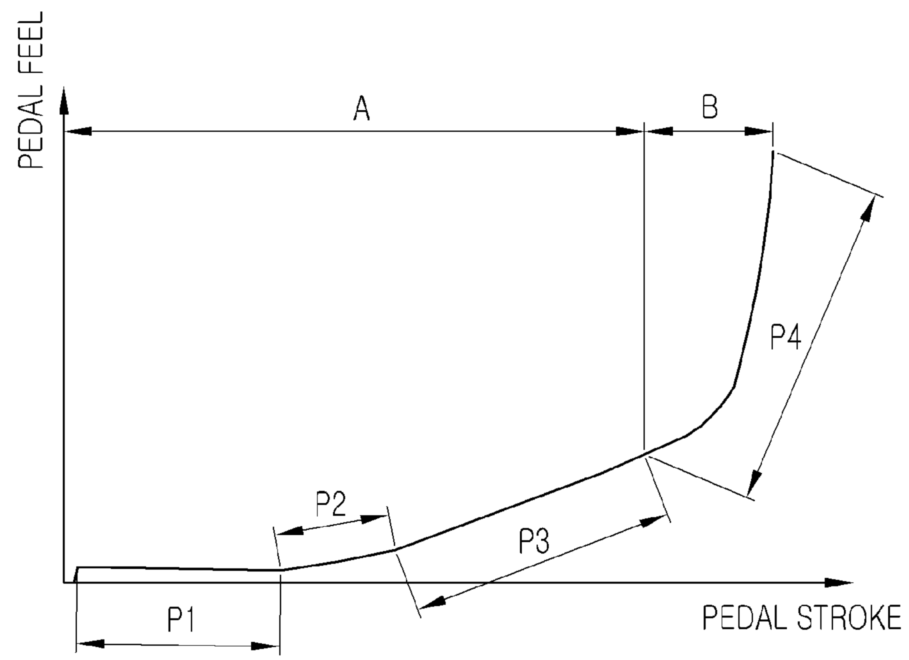
FIG. 5 is a graph a relationship between the pedal stroke by a pedal simulator and pedal feel according to an embodiment of the present invention.

FIG. 5 is a graph a relationship between the pedal stroke by a pedal simulator and pedal feel according to an embodiment of the present invention.

By providing the first and second reaction units to the pedal simulator 1 and configuring the second damping member 240 provided to the second reaction unit with the upper damper 241 and the lower damper 243, reaction force increases not along a first order straight line (see FIG. 1), but along a second order curve as shown in FIG. 5, which is similar to reaction force produced by a pedal simulator of a conventional brake system (CBS). Therefore, good pedal feel is created. Herein, the section P1 is a section in which the first reaction spring 120 is compressed according to foot force applied to the brake pedal (see '12' of FIG. 2) to produce reaction force. Section P2 is a section in which the reaction force from the first reaction spring 120 is added to the reaction force produced by pressing of the first damping member 130. The section P3 is a section in which the reaction force from the second reaction spring 220 is added to the reaction force produced when the upper damper 241 of the second damping member 240 is pressed. The section P4 is a section in which the reaction force from the second reaction spring 220 is added to the reaction force produced when the upper damper 241 and the lower damper 243 are pressed. Herein, sections P1 to P3 are the initial section A of the pedal stroke, and the section P4 is the terminal section B of the pedal stroke. That is, as shown in the graph, sections P1 to P3 has a maximized width as non-linear sections, while the curve in the section P4 rapidly rises due to high reaction force.

Consequently, the pedal simulator 1 for an active brake system according to one embodiment of the present invention adopts damping members having different hardness to provide lower reaction force from a damping member with low hardness in the wide initial operation section of relatively low effort force and provide reaction force from the damping member with high hardness in the narrow terminal operation section of the pedal, in which effort force is large. Thereby, the pedal feel of the brake may be improved.

As is apparent from the above description, a pedal simulator for active brake system according to one embodiment of the present invention is provided with a double damping structure to provide low reaction force in the initial section of braking and provide high reaction force in the terminal section of braking. Thereby, the pedal feel of the brake may be improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pedal simulator installed at a master cylinder to receive oil pressure according to a driver's foot force to provide pedal feel to the driver, the pedal simulator comprising:

a simulator block provided with an oil hole connected to the master cylinder, and provided therein with a bore to communicate with the oil hole;

a first reaction unit comprising a first reaction piston slidably installed in the bore, a first damping member installed at the first reaction piston to move together with the first reaction piston, and a first reaction spring compressed by the first reaction piston; and a second reaction unit comprising a second reaction piston provided in the bore to be spaced a certain distance apart from the first reaction piston and to support the first reaction spring and slide in the bore, a damping housing connected to the simulator block to be spaced a certain distance apart from the second reaction piston, a second reaction spring installed between the second reaction piston and the damping housing to be compressed by the second reaction piston, and a second damping member installed in the damping housing to contact the second reaction piston, wherein the second damping member is configured with an upper damper and a lower damper, wherein hardness of the lower damper is greater than or equal to hardness of the upper damper.

2. The pedal simulator according to claim 1, wherein a lower end of the upper damper is provided with a protrusion or groove, and an upper end of the lower damper is provided with a protrusion or groove having a shape corresponding to the protrusion or groove of the upper damper to be coupled to the upper damper.

3. The pedal simulator according to claim 1, wherein the first damping member and second damping member are formed of rubber to be elastically deformable.

4. The pedal simulator according to claim 3, wherein the damping housing comprises:

a body having a cylindrical shape with an open top and provided therein with an accommodation space; and a flange radially extending from an outer circumferential surface of a lower portion of the body, wherein the flange is connected to the bore.

5. The pedal simulator according to claim 4, wherein an upper surface of the flange is provided with a support groove to support the second reaction spring.

6. The pedal simulator according to claim 4, wherein the second damping member is installed in the accommodation space of the body to define a predetermined space between the second damping member and the accommodation space such that a volume of the space changes when the second damping member is elastically deformed by being pressed.

7. The pedal simulator according to claim 1, wherein a concave groove recessed upward to form a stepped portion is formed at a lower end of the first reaction piston, wherein the first damping member is installed in the concave groove, and an upper end of the first reaction spring is supported by the stepped portion.

8. The pedal simulator according to claim 7, wherein the second reaction piston comprises:

a protrusion protruding toward the first damping member to be spaced a certain distance from the first damping member; and an extension extending radially outward from a lower end of the protrusion, wherein the protrusion is inserted into the first reaction spring such that a lower end of the first reaction spring is supported by the extension.

9. The pedal simulator according to claim 8, wherein the first damping member contacts the second reaction piston to provide reaction force when the first reaction piston is pushed, and the second damping member is pressed to provide reaction force when the second reaction piston is pushed.

10. The pedal simulator according to claim 1, wherein a modulus of elasticity of the first reaction spring is lower than a modulus of elasticity of the second reaction spring such that the second reaction piston is pushed after the first reaction piston is pushed.

11. The pedal simulator according to claim 1, wherein a cap is installed at a lower end of the damper housing to fix the damper housing to the simulator block.

12. The pedal simulator according to claim 1, wherein the first reaction unit and the second reaction unit are arranged in series in the bore.

* * * * *